May 4, 1965 E. LEGLER 3,182,128

SYNCHRONIZING REMOTE AND LOCAL TELEVISION SIGNALS BY SHIFTING ONE SIGNAL UNTIL COINCIDENCE IS OBTAINED

Filed Dec. 27, 1962 3 Sheets-Sheet 1

Inventor:
Ernst Legler
by Michael S. Striker
attorney

Jnventor:
Ernst Legler
by Michael S. Striker
attorney

Inventor:
Ernst Legler
by Michael S. Striker
attorney 3,182,128
Patented May 4, 1965

3,182,128

SYNCHRONIZING REMOTE AND LOCAL TELEVISION SIGNALS BY SHIFTING ONE SIGNAL UNTIL COINCIDENCE IS OBTAINED

Ernst Legler, Darmstadt, Germany, assignor to Fernseh G.m.b.H., Darmstadt, Germany
Filed Dec. 27, 1962, Ser. No. 250,731
9 Claims. (Cl. 178—69.5)

The present invention is concerned with a method for synchronously relating the operation of remote and local television sync generators and a synchronizing lock-in arrangement suitable for this method. More specifically the present invention relates to a method and an arrangement which enables a change-over from one television studio to another.

In accordance with a known method a sync generator is controlled in two stages of operation by either one of two master oscillators operating at different frequencies (the frequency difference may be for example 1 c./s. referred to the frame frequency). In the first stage of operation the first master oscillator is synchronized by a remote sync generator, the second master oscillator controlling the local sync generator. When the frame synchronizing pulses of the local sync generator and the frame synchronizing pulses of the remote sync generator coincide in time, then there is effected by automatic means a change-over in order to control the local sync generator by the first master oscillator (second stage of operation).

In this known method the local sync generator is thus occasionally controlled by different frequencies. This can't be done however in a modern precision-offset television system, since the sync generator of such a system is controlled by a frequency remaining constant within very close limits by means of a crystal master oscillator.

It is one object of the present invention to provide a method and a synchronizing arrangement which enables a change-over from one studio to another and which can be employed in a modern precision-offset television system.

It is a further object of the present invention to provide a lock-in arrangement for remote and local sync generators controlled by differently phased but practically equal synchronizing frequencies.

It is a sitll further object of the present invention to provide a method and an arrangement for phasing the line synchronizing pulses produced by the local sync generator with the line synchronizing pulses produced by a remote sync generator.

Another object of the present invention is to provide an electronic phase-shifter suitable to shift the phase of the local line synchronizing signal over a range of at least one period.

The present invention contemplates the synchronization of a remote television sync generator with a local television sync generator in three successive stages of operation. This local sync generator is controlled either by remotely generated line synchronizing pulses via a first gate or by locally generated line synchronizing pulses via a second gate. These gates are controlled by a bistable trigger circuit, by a change-over switch, and by a coincidence circuit opening either one of the gates and closing the other one. In the first stage of operation the local sync generator is being controlled by the local sync generator via the first gate, while the change-over switch is set accordingly. In order to initiate a change-over (second stage of operation) the change-over switch is set to enable the opening of the second gate as soon as an output pulse (trigger pulse) of the coincidence circuit is fed to the trigger circuit. Besides that the phase of the locally generated line synchronizing pulses is swept over a range of at least one period. At the instant of phase coincidence between the locally and the remotely generated line synchronizing pulses applied to two inputs of the coincidence circuit the third stage of operation begins, this coincidence circuit feeding an output pulse to the trigger circuit via the change-over switch, closing the first gate and opening the second gate in order to control the local sync generator by the remotely generated line synchronizing pulses.

In accordance with a preferred embodiment of the invention to be described herein the local synchronizing pulses are generated by means of a crystal master oscillator running at twice the line frequency and a subsequent frequency divider. These locally generated line synchronizing pulses are applied to a voltage controlled electronic phase-shifter which upon initiation of any change-over receives a control signal which shifts the phase of these pulses over a range of at least one period. This control signal advantageously corresponds to a bell-shaped variation of potential, rising from an initial level smoothly to a maximum and falling smoothly again to its initial level. The alterations of potential in this signal should take place so slowly that the resulting transient frequency alterations of the line synchronizing pulses are relatively small in comparison with the line synchronizing frequency itself. This frequency deviation should in general be less than 1/1000 of the line synchronizing frequency.

The novel features which are considered as characteristic for the invention are set forth in particular in the appended claims. The invention itself however, both as to its construction and its method of operation together with additional objects and advantages thereof, will be best understood from the following description of specific embodiments when read in connection with the accompanying drawing, in which:

In all these drawings corresponding elements are designated by the same reference numerals.

FIGURE 1 shows a circuit arrangement for changing-over the synchronization of a television studio, those elements necessary for obtaining phase-synchronization of the frame synchronizing pulses being omitted for the sake of simplicity in illustration. The arrangements necessary for this purpose are well known in the art and are not considered to require particular description.

Figure 1:
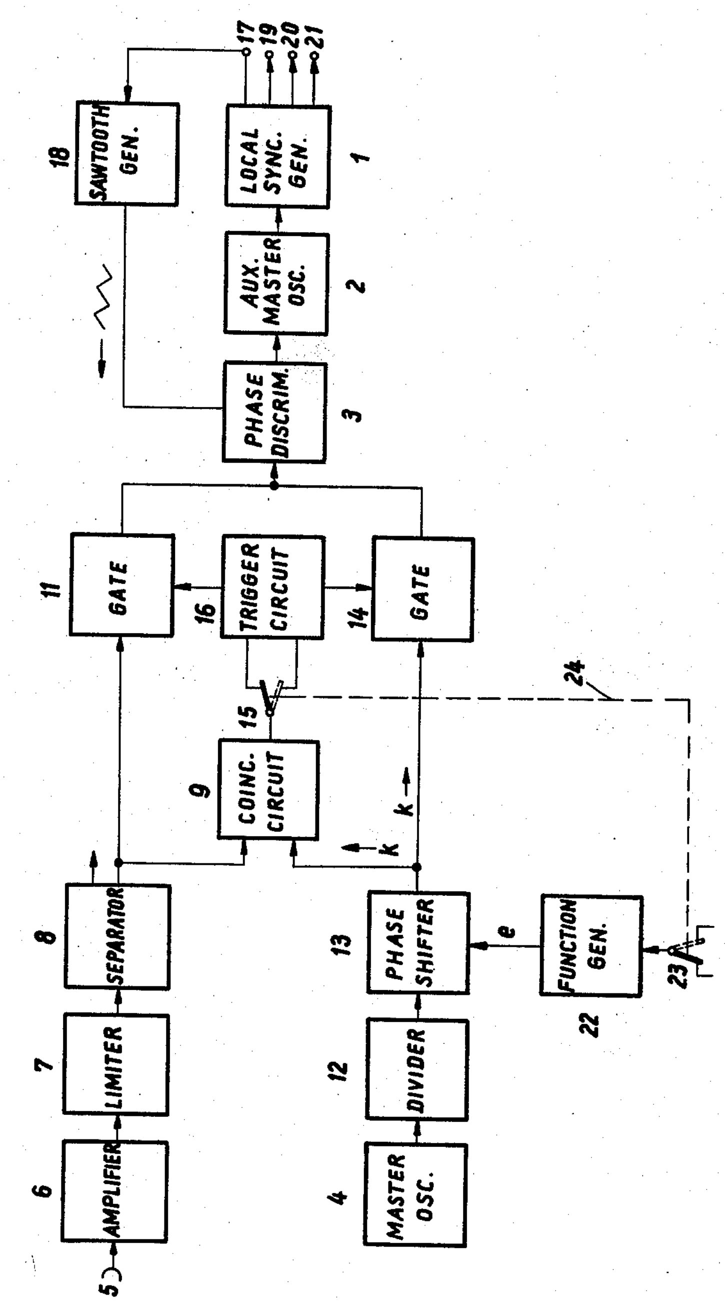
FIGURE 1 is a block diagram of one embodiment of apparatus for carrying out the present invention.

In FIGURE 1 there is shown a local sync generator 1 driven by an auxiliary, line-frequency master oscillator 2 which, by the use of a phase discriminator 3 is synchronized either with the television signal from a remote source received at a terminal 5 or with line synchronizing pulses generated by means of a local master oscillator 4.

The remote television signal, which will usually be composed of a video component, a blanking component and synchronizing pulses, is applied by way of terminal 5 to an amplifier 6, the output of which is fed to a limiter 7 which allows only the synchronizing pulses to pass to a separator 8 in which the frame synchronizing pulses are separated from the line synchronizing pulses. The line synchronizing pulses thus derived from the remote signal are applied on the one hand to the input of a coincidence circuit 9 and on the other hand to a gate 11.

The local master oscillator 4 oscillates at twice the line frequency and, for precision-offset working is a crystal oscillator of very high frequency stability. In a subsequent divider 12 there is effected the extraction of the line frequency synchronizing pulses which are applied to a voltage-controlled electronic phase shifter 13.

Figure 3:
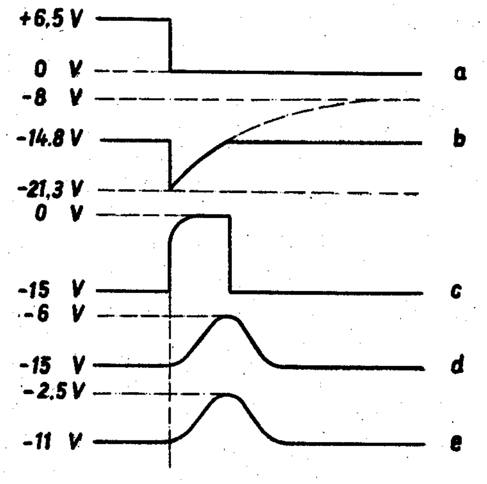
Figure 4:
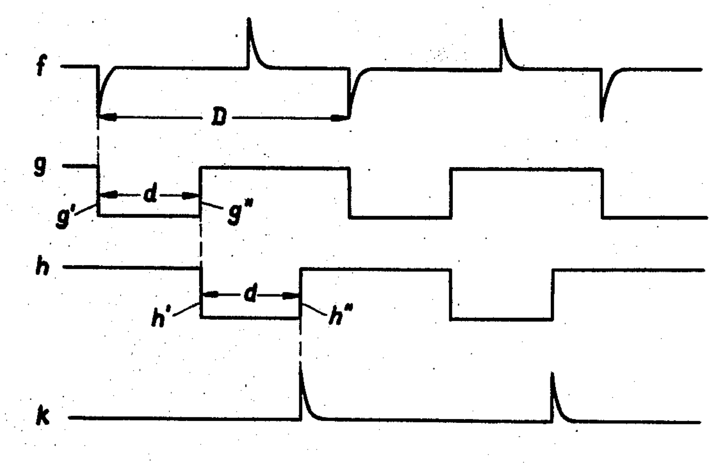

In the following description of the operation of the apparatus, reference will also be made to the waveform diagrams shown in FIGURE 3.

The output pulses from phase shifter 13, that is, the local line synchronizing pulses *k* are applied on the one hand to an input of the coincidence circuit 9 and on the other hand to a gate 14. A pulse appears at the output of the coincidence circuit 9 only when the remote and the local line synchronizing pulses applied to its inputs coincide in phase. With the help of a manually-operated change-over switch 15 the output signal from the coincidence circuit is applied selectively to one of the two inputs of a bistable trigger circuit 16, which together with the gates 11 and 14 forms an electronic change-over switch for the line synchronizing pulses. This change-over switch effects the change-over operation only when these two trains of line synchronizing pulses coincide in phase.

The train of line synchronizing pulses which is at any time applied to the phase discriminator 3 from gate 11 or 14 is used to control the local sync generator. For this purpose the line synchronizing pulses produced in the local generator 1 are applied by way of terminal 17 to a sawtooth generator 18, in which a train of line frequency sawtooth pulses is produced and from which this pulse train is applied to phase discriminator 3. In the local sync generator 1 there are also produced frame synchronizing pulses, blanking pulses and a train of mixed synchronizing pulses, these pulse trains being fed out by way of terminals 19, 20 and 21 respectively.

To force coincidence between the local and remote line synchronizing pulses there is applied to the phase shifter 13 from a function generator 22 a bell-shaped control signal *e* which is produced and fades away again at each actuation of the synchronizing change-over switch 15. A signal of this form may be produced in a simple manner by repeated integration of a rectangular pulse. The signal is initiated by the action of a switch 23, which is coupled with the synchronizing change-over switch 15 as indicated symbolically by broken line 24. In the setting of these switches shown in the drawing the local studio is being synchronized by the remote line synchronizing pulses, whereas on operating the switches to the position shown in broken line the local line synchronizing pulse *k* would control the local sync generator 1.

Figure 2:
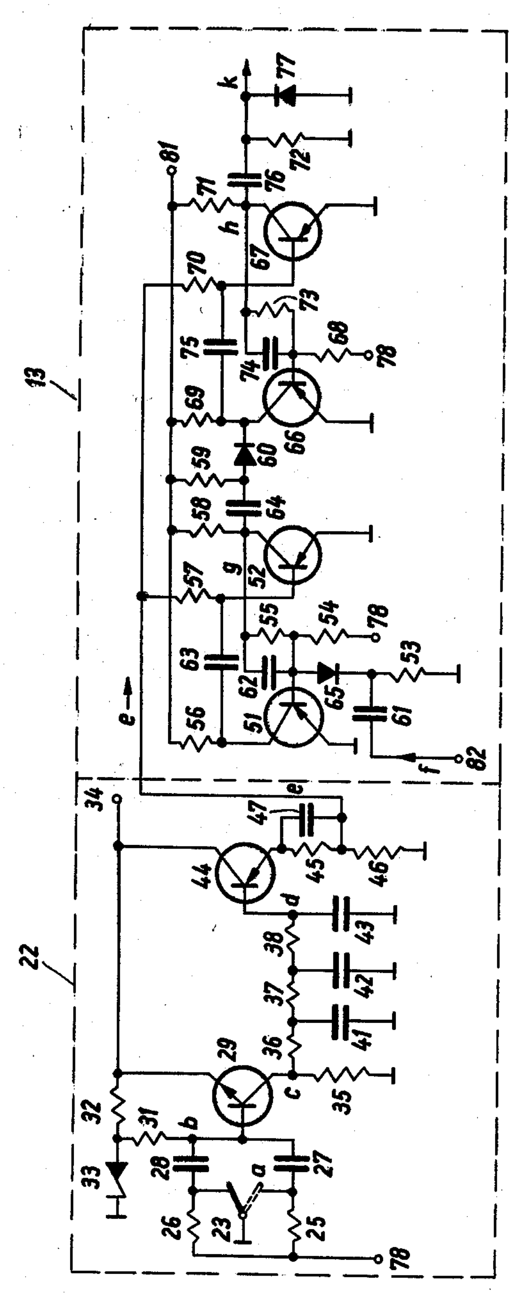
FIGURE 2 is a circuit diagram showing in more detail the circuit arrangement contained in two of the elements of FIGURE 1, and FIGURES 3 and 4 show pulse trains such as occur in the circuit arrangements shown in FIGURE 2.

FIGURE 2 shows in more detail an embodiment of a circuit arrangement suitable for use as the function generator 22 and the electronic phase shifter 13 of FIGURE 1. At each actuation of change-over switch 15 and the switch 23 coupled to it, the formerly unearthed plate of one of a pair of capacitors 27, 28 connected to the base of a transistor 29, which are positively charged by way of a respective one of two resistors 25, 26, from a voltage source represented only as a terminal 78, is connected to earth. The negative-going voltage step thus produced is applied to the base of transistor 29, so that this transistor becomes cut off until the earthed capacitor has charged through resistors 31 and 32 to an extent such that the base of transistor 29 has become slightly more positive than the emitter. The conductive (saturated) condition is then again established. A Zener diode 33 serves to stabilize the voltage applied to the base resistor 31 by way of terminal 34 to a value of −15 volts.

There then appears on the collector resistor 35 of transistor 29 a positive-going voltage which traverses an integrating network consisting of the resistances 36, 37, 38 and the capacitors 41, 42, 43 and is fed out by way of an impedance converter composed of a transistor 44 with a divided emitter load consisting of resistors 45, 46, of which that nearer the emitter is shunted by a capacitor 47, and is employed to control the phase shifter 13.

Component values suitable for use in the function generator 22 are as follows:

| | | |
|---|---|---|
| Transistors: | | |
| 29 | | OC141 |
| 44 | | BCZ11 |
| Zener diode: | | |
| 33 | | Z8 |
| Capacitors: | | |
| 27, 28 | μf | 100 |
| 41, 42, 43 | μf | 25 |
| 47 | nf | 175 |
| Resistors: | | |
| 25, 26 | | 10K |
| 31 | | 22 |
| 32 | | 3.3K |
| 35 | | 1K |
| 36, 37, 38 | | 3.9K |
| 45 | | 1.5K |
| 46 | | 22K |

The phase shifter portion 13 of the circuit shown in FIGURE 2 consists of two monostable trigger circuits connected in cascade. Each of these monostable circuits comprises a pair of transistors 51, 52 and 66, 67 respectively, which are cross-coupled by a D.C. coupling in one direction and by an A.C. coupling in the other direction, to form a well-known type of monostable trigger. Component values suitable for use in a 625-line television system are given below:

| | | |
|---|---|---|
| Transistors: | | |
| 51, 52, 66, 67 | | 2SA17 |
| Diodes: | | |
| 60, 65, 77 | | OA72 |
| Capacitors: | | |
| 61, 62, 74 | pf | 100 |
| 63, 75 | nf | 2.5 |
| 64, 76 | pf | 250 |
| Resistors: | | |
| 53, 59 | | 10K |
| 54 | | 270K |
| 55, 73 | | 33K |
| 56, 58, 68, 69 | | 1K |
| 57, 70 | | 22K |
| 72 | | 5.6K |
| Voltage at terminal 78 | v | +6.5 |
| Voltage at terminal 81 | v | −5 |

The operation of monostable circuits of this type is well understood in the art and a detailed description is not thought to be necessary. In general, negative-going spikes of voltage applied to the base of the first transistor 51 by way of a diode 65 initiate the production at the collector of the second transistor 52 of a positive-going pulse, the duration of which depends upon the potential to which the base of the second transistor is returned through resistor 57.

The first monostable trigger circuit is triggered by a train *f* of horizontal-frequency synchronizing pulses which are received at an input terminal 82 from frequency divider 12 of FIGURE 1. The negative-going spikes of train *f* cause the production of the leading edges *g′* in the waveform *g* arising at the collector of the second transistor 52. The duration *d* of these pulses depends upon the potential applied to the base of transistor 52 by way of resistor 57, that is, upon the signal *e* received from the function generator. The positive-going trailing edges of the pulses appearing at the collector of transistor 52 pass through diode 60 to the collector of the first transistor 66 of the second monostable trigger to initiate the production of the leading edge *h′* of the pulse train *h* developed by this trigger circuit. The duration *d* of the pulses *h* is again dependent upon the value of the signal *e*. Negative-going spikes in the output signal *k* are suppressed by a diode 77 connected from the output terminal to earth, so that the output signal consists of positive-going spikes occurring at intervals 2*d* after the triggering pulses *f*. The pulse widths *d* of the pulse trains *g* and *h* are arranged to be equal to 0.25D (where *D*=period of one scanning line) when the signal *e* has its minimum value and to increase to 0.8D when the control signal *e* has its least negative value. The total phase shift of the output impulses *k* thus amounts to $2(0.8-0.25)D=1.1D$, or somewhat more than 360°.

While the invention has been illustrated and described as embodied in an arrangement which enables a change-over from one studio to another it is not intended to be limited to the details shown, since various modifications and structural changes may be made without departing in any way from the spirit of the present invention.

I claim:

1. Method for changing-over from one television signal synchronized by a local sync generator to another television signal synchronized by a remote sync generator operating at practically equal synchronizing frequencies comprising, in combination, the steps of controlling the local sync generator either by local line synchronizing pulses or by remote line synchronizing pulses; initiating a change-over process from one television signal to the other television signal; shifting the phase of said local line synchronizing pulses over a range of at least one period; effecting automatically the actual change-over from one television signal to the other at the instant of phase coincidence between said local and remote line synchronizing pulses.

2. Method for synchronizing a remote sync generator with a local sync generator comprising, in combination, the steps of setting a moveable member of a manually operated change-over switch to one of its two positions and thus effecting the opening of a first gate; generating local line synchronizing pulses; applying said local line synchronizing pulses via said first gate to said local sync generator; applying said local line synchronizing pulses to one input of a coincidence circuit; applying remote line synchronizing pulses to a second gate and to a second input of said coincidence circuit; setting said moveable member to the other one of said two positions and thus enabling eventually the opening of said second gate as soon as said coincidence circuit produces an output pulse; shifting the phase of said local line synchronizing pulses over a range of at least one period; applying an output pulse of said coincidence circuit at the instant of coincidence of said remote line and local line synchronizing pulses via the manually operated change-over switch to a bistable circuit effecting the closing of said first gate and the opening of said second gate; applying said remote line synchronizing pulses via said second gate to said local sync generator; and controlling said local sync generator by said remote sync generator.

3. Method according to claim 2 comprising, in combination, the steps of generating local synchronizing pulses by means of a crystal master oscillator running at twice the line frequency; dividing the frequency of said local synchronizing pulses by means of a frequency divider and generating said local line synchronizing pulses; generating a control signal corresponding to a bell-shaped variation of potential rising from an initial level smoothly to a maximum and falling smoothly again to its initial level; applying said control signal to a voltage controlled electronic phase shifter and thus shifting the phase of said local line synchronizing pulses over a range of at least one period.

4. Method according to claim 2 comprising, in combination, the steps of generating a control signal; applying said control signal to a voltage controlled electronic phase shifter and thus effecting a change in frequency of said local line synchronizing pulses which is small in comparison with the nominal frequency of said line synchronizing pulses and preferably does not exceed 1/1000 of that frequency.

5. Arrangement for synchronizing a remote television sync generator with a local television sync generator comprising, in combination, a local television sync generator for generating local line synchronizing pulses; a voltage regulated electronic phase shifter; connection means connecting the output of said generator generating local line synchronizing pulses with one input of said phase shifter; a source of remote line synchronizing pulses; a first gate; connection means connecting the output of said phase shifter with the input of said first gate; connection means connecting the output of said first gate with said local sync generator; a second gate; connection means connecting the output of said source with one input of said second gate; connection means connecting the output of said second gate with said local sync generator; a coincidence circuit having two inputs and one output producing a trigger pulse whenever two pulses applied to said inputs coincide in time; connection means connecting said output of said phase shifter with one input of said coincidence circuit; connection means connecting the output of said source with the second input of the coincidence circuit; a bistable trigger circuit having two inputs corresponding to said first and second gates respectively and closing either one and opening the other of said gates whenever a trigger pulse is being applied to said corresponding inputs; a manually operated change-over switch connecting said output of said coincidence circuit in two positions with either one of the inputs of said bistable trigger circuit and thus effecting the opening of the corresponding gate whenever a trigger pulse is produced by said coincidence circuit and further effecting a phase shift of said local line synchronizing pulses over a range of at least one period by means of said phase shifter whenever said change-over switch is being operated.

6. Phase shifter according to claim 5 comprising, in combination, two monostable trigger circuits connected in cascade; connection means connecting the output of said generator generating said local line synchonizing pulses with the input of the first one of said two monostable trigger circuits; connection means connecting the output of the second one of said two monostable trigger circuits with the input of said first gate and with said one input of said coincidence circuit; a further generator generating a control signal whenever said change-over switch is being operated; connection means applying said control signal to said two monostable trigger circuits controlling the widths of pulses generated by said monostable trigger circuits and thus shifting the phase of said local line synchronizing pulses.

7. Phase shifter according to claim 5 comprising, in combintion, two monostable trigger circuits being connected in cascade and employing two transistors each; connection means connecting the output of said generator with the input of the first of said two monostable trigger circuits; connection means connecting the output of the second one of said two monostable trigger circuits with the input of said first gate and with said one input of said coincidence circuit; a further generator generating a control signal whenever said change-over switch is being operated; connection means applying said control signal as bias voltage to the base of that transistor of which the non-contacting condition determines the duration of the pulses developed.

8. Arrangement according to claim 5 comprising, in combination, a further generator generating a control signal corresponding to a bell-shaped variation of potential rising from an initial level smoothly to a maximum and falling smoothly again to its initial level whenever said change-over switch is being operated; connection means connecting said further generator with said voltage controlled phase shifter and effecting said phase-shift of said local line synchronizing pulses.

9. Arrangement according to claim 5 comprising, in combination, an additional switch having a moveable member able to be connected to either one of two leads; a network being connected with said two leads producing a voltage step whenever the position of said member is changed; means coupling said change-over switch with said additional switch; a plurality of integrating networks connected in cascade generating a control voltage whenever a voltage step is being applied to said integrating networks; connection means connecting the integrating networks with said phase shifter effecting said phase shift of said local line synchronizing pulses.

References Cited by the Examiner

UNITED STATES PATENTS

| | | | |
|---|---|---|---|
| 3,047,658 | 7/62 | March | 178—69.5 |
| 3,112,364 | 11/63 | Myles | 178—69.5 |

DAVID G. REDINBAUGH, *Primary Examiner.*